United States Patent
Pfab

(10) Patent No.: US 12,061,066 B2
(45) Date of Patent: Aug. 13, 2024

(54) REFLECTOR SIGHT FOR A PORTABLE FIREARM

(71) Applicant: VECTED GmbH, Fürth (DE)

(72) Inventor: Wolfgang Pfab, Nuremberg (DE)

(73) Assignee: VECTED GmbH, Fürth (DE)

( * ) Notice: Subject to any disclaimer, the term of this patent is extended or adjusted under 35 U.S.C. 154(b) by 90 days.

(21) Appl. No.: 18/012,595

(22) PCT Filed: Jun. 14, 2021

(86) PCT No.: PCT/EP2021/065920
§ 371 (c)(1),
(2) Date: Dec. 22, 2022

(87) PCT Pub. No.: WO2021/259687
PCT Pub. Date: Dec. 30, 2021

(65) Prior Publication Data
US 2023/0251060 A1   Aug. 10, 2023

(30) Foreign Application Priority Data
Jun. 22, 2020 (DE) ..................... 10 2020 116 440.8

(51) Int. Cl.
*F41G 1/30* (2006.01)
*G02B 17/08* (2006.01)
(Continued)

(52) U.S. Cl.
CPC ............ *F41G 1/30* (2013.01); *G02B 17/086* (2013.01); *G02B 23/04* (2013.01); *G02B 27/0025* (2013.01)

(58) Field of Classification Search
CPC ......... F41G 1/30; G02B 17/086; G02B 23/04; G02B 27/0025
(Continued)

(56) References Cited

U.S. PATENT DOCUMENTS

2015/0000377 A1* 1/2015 Qajar ................... G01N 15/088
                                                                         73/38
2015/0377587 A1   12/2015 Couture
(Continued)

FOREIGN PATENT DOCUMENTS

CA    3 068 772 A1      1/2019
GB      2603888 A  *   8/2022    ............... F41G 1/30
(Continued)

OTHER PUBLICATIONS

Written Opinion of the International Searching Authority dated Aug. 27, 2021 in PCT/EP2021/065920 filed Jun. 14, 2021 (6 pages).

*Primary Examiner* — Samir Abdosh
(74) *Attorney, Agent, or Firm* — FRESH IP PLC; Terrence L. B. Brown

(57) ABSTRACT

A reflector sight (2) for a portable firearm has an optical system for generating a natural image of a target region, a display (4) for reproducing an electronic image of the target region created by an electronic image creation unit and a beam splitter cube (6) for overlaying the natural image with the electronic image of the target region reproduced by the display (4). According to the invention, the display (4) is arranged on a first flat face (10) of beam splitter cube (6), to which flat face a correction lens (12) is connected (12), the face (14) of which facing the display is convex, wherein a mirror lens element (18) is connected to a second flat face (16) of the beam splitter cube, the mirrored face (20) of which mirror lens element facing away from the beam splitter cube (6) is convex and aspherical and wherein the beam splitter cube (6), the correction lens (12) and the mirror lens element (18) form a correction block that consists of silica glass and/or.

11 Claims, 3 Drawing Sheets

Figure 1:
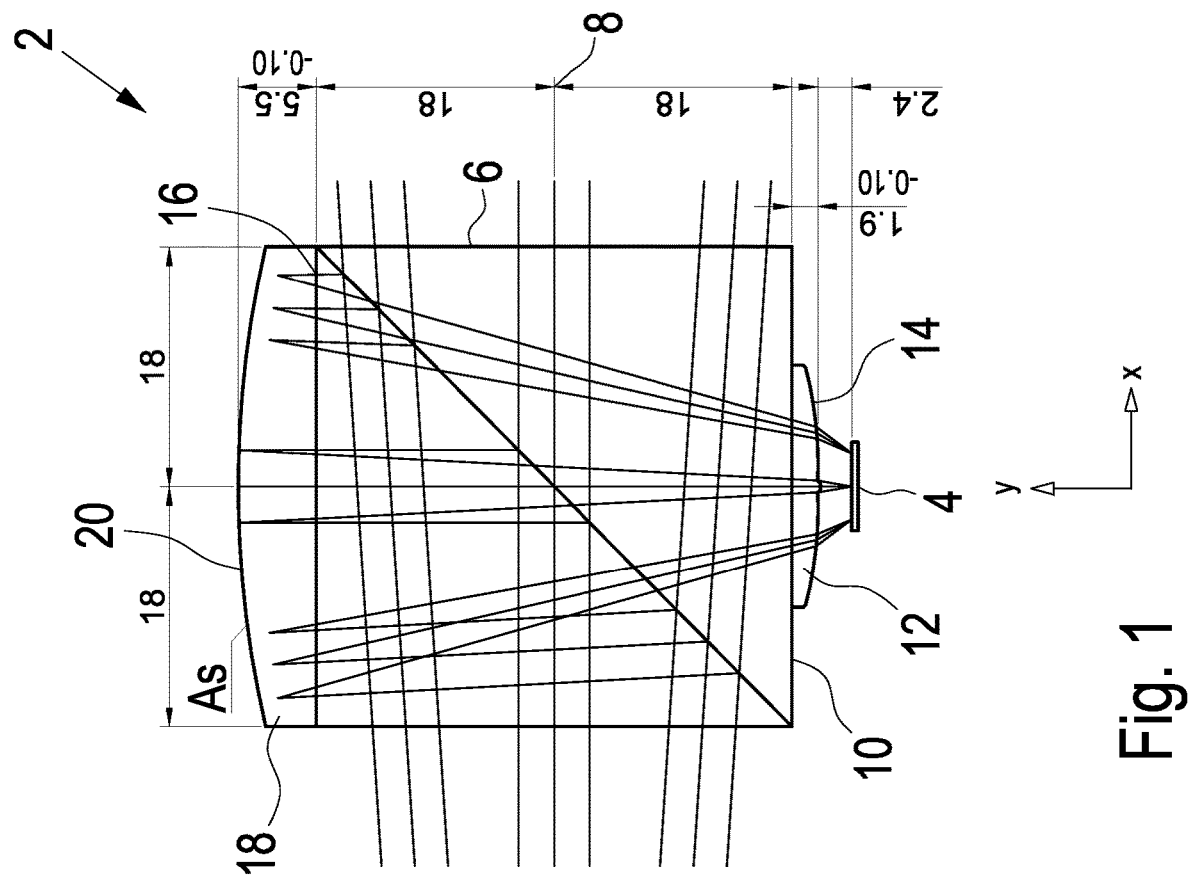
Figure 1:
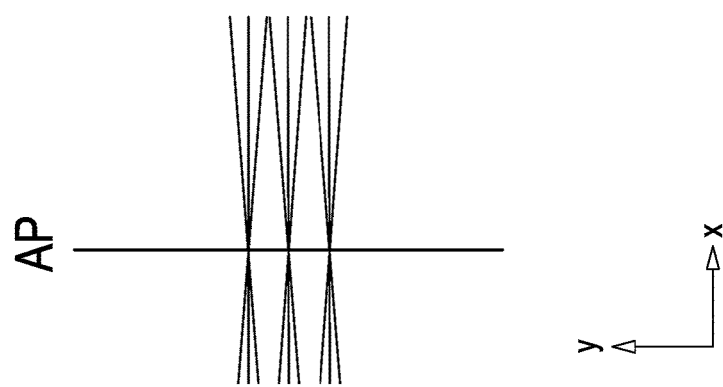

(51) Int. Cl.
  *G02B 23/04* (2006.01)
  *G02B 27/00* (2006.01)
(58) Field of Classification Search
  USPC .......................................................... 42/118
  See application file for complete search history.

(56) References Cited

U.S. PATENT DOCUMENTS

| | | | |
|---|---|---|---|
| 2016/0000131 A1* | 1/2016 | Vescovi | A23L 2/39 |
| | | | 426/87 |
| 2016/0131454 A1 | 5/2016 | Jung et al. | |
| 2016/0377378 A1* | 12/2016 | Collin | G02B 23/10 |
| | | | 42/113 |
| 2019/0072364 A1* | 3/2019 | VanBecelaere | F41G 1/545 |
| 2021/0055536 A1* | 2/2021 | DeAngelis | F41G 1/30 |

FOREIGN PATENT DOCUMENTS

| | | | | |
|---|---|---|---|---|
| JP | 2020514828 A | | 5/2020 | |
| KR | 20150020519 A | * | 2/2015 | |
| KR | 20200102388 A | * | 8/2020 | |
| WO | WO-2020096933 A1 | * | 5/2020 | .............. F41G 1/30 |

\* cited by examiner

REFLECTOR SIGHT FOR A PORTABLE FIREARM

The invention relates to a reflector sight of the type mentioned in the preamble of claim 1 for a portable firearm.

Such reflector sights are generally known and are characterized in relation to telescopic sights in that they are parallax-free and the shooter detects the target by eye.

EP 0 658 788 B1 discloses a reflector sight for a portable firearm, in which a natural image of a target region, generated by an optical system of the reflector sight, is overlaid with an electronic image of the target region in the form of a thermal image.

EP 2 601 475 B2 also discloses a reflector sight in which a natural image of the target region, generated by an optical system of the target region, is overlaid with a thermal image. In order to overlay the natural image with the thermal image, a prism is provided, a display being connected to a face of the prism, which display serves to reproduce the thermal image.

EP 1 920 287 B1 discloses a day/night vision apparatus in which a switchover between different operating modes is effected by means of a rotatably mounted beam splitter.

EP 2 172 003 B1 discloses a camera in which a natural image is overlaid with a thermal image. By means of a special method, the distance from a considered object is determined and the result is used for overlaying the images.

WO 2019/007973 A1 discloses a reflector sight having the features of the preamble of claim 1, which comprises an optical system for generating a natural image of a target region, a display for reproducing an electronic image of the target region that is created by an electronic image reaction unit, and a beam splitter cube for overlaying the natural image with the electronic image of the target region reproduced by the display.

The object of the invention is to specify a reflector sight of the type mentioned in the preamble of claim 1, the properties of which are improved.

This object is achieved by the invention specified in claim 1.

The invention provides that the display is arranged on a first flat face of the beam splitter cube, to which flat face a correction lens is connected, the flat face of which facing the display is convex, such that a mirror lens element is connected to a second flat face of the beam splitter cube, the mirrored face of which mirror lens element facing away from the beam splitter cube is convex and aspherical, and in that the beam splitter cube, the correction lens and the mirror lens element form a correction block which consists of silica glass and/or plastics material.

The invention provides a monolithic or quasi-monolithic correction block using a catadioptric optical arrangement. As a result, an excellent optical correction in a wide visual field is achieved with a minimum of dioptric faces, and specifically even if the position of the eyes of the shooter, relative to the reflector sight, changes within wide limits.

In optical terms, a further advantage of the reflector sight according to the invention is that a high to complete vignetting freedom is made possible.

The invention provides a reflector sight that combines an excellent image quality with a low weight. In addition, the reflector sight has a small installation height in the beam direction of the display, and is thus particularly compact.

The combination of features according to the invention ultimately provides a reflector sight having particularly advantageous properties.

The manufacturing effort for the optical system according to the invention is kept relatively low by virtue of the fact that, for optical correction, according to the invention, merely two dioptric faces are used.

An advantageous further embodiment of the invention provides that the correction lens and the mirror lens element are each formed by a plano-convex lens, the flat face of which is connected to the associated flat face of the beam splitter cube. In addition to the simplification of the manufacture, this embodiment has the particular advantage that the connection of the correction lens and the mirror lens element to the beam splitter cube takes place via flat faces, such that, during assembly, a displacement of the optical elements relative to one another is possible in order to thereby perform an optical adjustment, for example and in particular with regard to the centering of the correction lens and the mirror lens element.

Another advantageous embodiment of the invention provides that the correction lens and the mirror lens element are formed integrally with the beam splitter cube. If the correction block consists of a plurality of optical components, these components can consist of the same material. It is also possible, however, according to the invention, to use components of different materials. In particular, it is possible to design the correction block as a hybrid block, which combines at least one optical component made of silica glass with at least one optical component made of plastics material.

If at least one optical component of the reflector sight according to the invention consists of plastics material, the plastics material can be a polycarbonate for example. In particular Zeonex® can also be used as the plastics material.

Another advantageous embodiment of the invention provides that the mirror lens element is manufactured from a mirror lens which is machined in such a way that the cross section of the face of the mirror lens element facing the beam splitter cube corresponds to the cross section of the beam splitter cube. In this embodiment, the mirror lens element is manufactured starting from a mirror lens, in that its edge is machined in such a way that the cross sections of the mirror lens element, on the one hand, and the associated flat face of the beam splitter cube, on the other hand, coincide in the contact plane between the mirror lens element and the beam splitter cube.

Another advantageous embodiment of the invention provides that the display is designed and arranged for reproducing a thermal image in such a way that the natural image of the target region is overlaid with a thermal image of the target region, by means of the beam splitter cube. In this embodiment, the reflector sight is designed as a thermal image reflector sight.

In principle, the optical components of the correction block can consist of the same material. An advantageous further embodiment of the invention provides that the correction block has at least one optical element made of silica glass, and at least one optical element made of plastics material.

An advantageous further embodiment of the aforementioned embodiment provides that the beam splitter cube consists of silica glass, and that the correction lens and/or the mirror lens element consist or consists of plastics material.

Another advantageous embodiment of the invention provides that at least one optical component made of silica glass is adhesively bonded to at least one optical component made of plastics material. In this embodiment, the components can, for example, be connected to one another by precision bonding.

Another embodiment of the invention provides that the first flat face and the second flat face are formed by mutually opposing flat faces of the beam splitter cube, In contrast, a further advantageous embodiment of the invention provides that the first flat face and the second flat face are formed by flat faces of the beam splitter cube that adjoin one another, and that the mirror lens element is designed as a half mirror.

An aspherical optical face, for example of a mirror lens element or a correlation lens, is understood, according to the invention, to mean an optically effective face which is non-spherical, at least in portions or in part. Within the meaning of the invention, for example and in particular also a Fresnel lens is understood to be an aspherical lens.

A portable firearm according to the invention is specified in claim 11 and comprises a reflector sight according to the invention.

The invention is explained in more detail below on the basis of an embodiment, with reference to the accompanying drawing. In this case, all the features shown in the drawing, described in the description, and claimed in the claims, taken individually and in any technically meaningful combination with one another, form the subject matter of the invention, irrespective of how they are summarized in the claims and their dependency references, and irrespective of their description or representation in the drawing.

Figure 2:
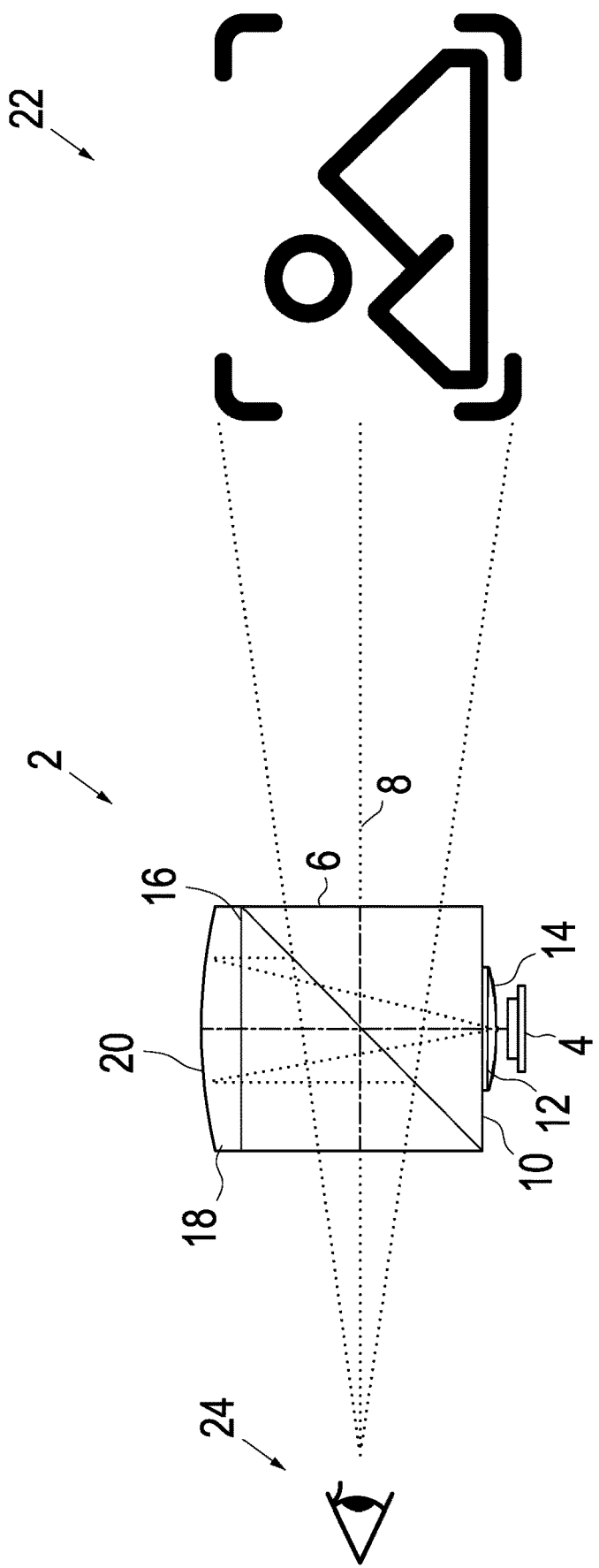
Figure 3:
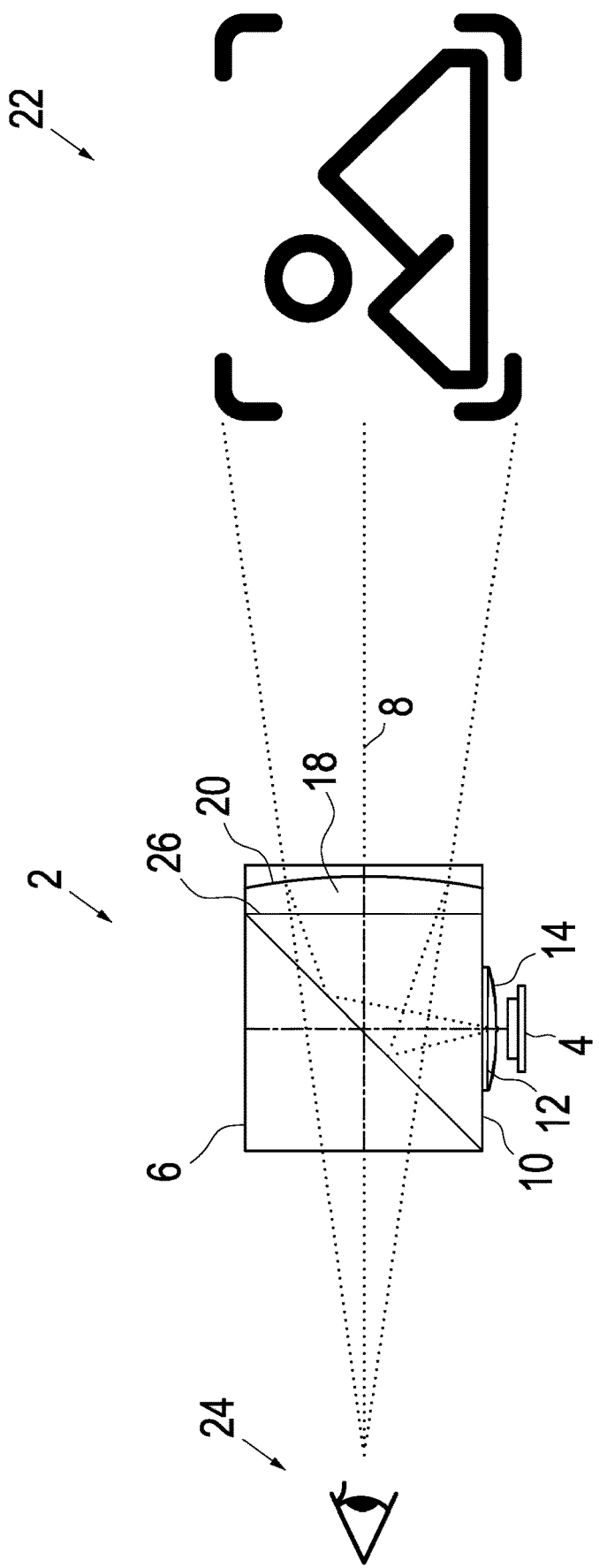

In the drawing:

FIG. 1 is a schematic view of a part of the optical system of an embodiment of a reflector sight according to the invention in the form of a thermal image reflector sight for a portable firearm in the region of a correction block, FIG. 2 is a schematic diagram for illustrating the mode of operation of the reflector sight or correction block according to the invention, and FIG. 3 shows a modification of the embodiment according to FIG. 2, in the same illustration as FIG. 2.

The basic structure of a thermal image reflector sight is generally known, for example from EP 0 658 788 B1, and is therefore not described in more detail here.

The reflector sight 2 according to the invention comprises an optical system for generating a natural image of a target region. The corresponding structure of such an optical system is generally known to a person skilled in the art, and is therefore explained in more detail here only insofar as is necessary for understanding the invention.

The reflector sight 2 comprises a display 4 for reproducing an electronic image of the target region created by an electronic image creation unit, which, in this embodiment, is formed by a thermal imaging camera, such that the display 4 is designed for reproducing a thermal image of the target region. The structure and mode of operation of a corresponding thermal imaging camera are generally known to a person skilled in the art and are therefore not explained in more detail here.

The reflector sight 2 further comprises a beam splitter cube 6 for overlaying the natural image with the thermal image reproduced by the display 4.

The display 4 is assigned to a first flat face 10 of the beam splitter cube 6 and is arranged thereon.

The optical axis of the optical system of the reflector sight 2 is denoted in the drawing by reference sign 8. It can be seen that the thermal image reproduced by the display 4 is blended into the natural image via the beam splitter cube 6.

The exit pupil is denoted by "AP" in FIG. 1,

A correction lens 12 is connected to the first flat face 10 of the beam splitter cube 6, the face 14 of which facing the display 4 is convex.

In this embodiment, a mirror lens element 18 is connected to a second flat face 16 of the beam splitter cube 6 opposite the first flat face 10, the mirrored face 20 of which mirror lens element facing away from the beam splitter cube 6 is convex and aspherical.

In the embodiment shown, the correction lens 14 and the mirror lens element 18 are designed as plano-convex lenses, which are adhesively bonded, by their flat face, to the associated first flat face 10 or second flat face 16 of the beam splitter cube 6, respectively. When assembling the correction lens 14 and the mirror lens element 18, it is possible to displace the correction lens 14 or the mirror lens element 18 on the associated flat face 10 or 16, respectively, in order to thereby carry out an optical adjustment of the correction block formed by the beam splitter cube 6, the correction lens 14 and the mirror lens element 18.

The mirror lens element 18 is manufactured from a mirror lens which is machined in such a way that the cross section of the face of the mirror lens element 18 facing the second flat face 16 of the beam splitter cube 6 corresponds to the cross section of the second flat face 16.

In the embodiment shown, the beam splitter cube 6, the correction lens 14 and the mirror lens element 18 consist of the same material, specifically of silica glass (fused silica).

During operation of the reflector sight 2, the thermal image recorded by the thermal imaging camera and reproduced by the display 4 is blended into the natural image recorded by the optical system of the reflector sight 2, such that the aiming at a target with a portable firearm equipped with the reflector sight 2 is facilitated, even in poor lighting conditions.

The reflector sight according to the invention is relatively simple in construction, compact and offers an excellent image quality, at a low weight and with a minimum of dioptric faces, and thus constitutes a significant improvement compared with known reflector sights.

FIG. 2 illustrates, in a schematic diagram, the beam path from an object 22, via the correction block of the reflector sight 2, to an eye 24 of a user.

FIG. 3 shows, in the same illustration as in FIG. 2, a second embodiment of a reflector sight 2 according to the invention, which differs from the first embodiment in that the mirror lens element 18 is arranged on an object-side flat face 26 adjoining the first flat face 10, the mirrored face 20 being formed as a half mirror. In the second embodiment, the second flat face is thus formed by the flat face 26.

With regard to the optics design and the properties of the reflector sight 2, the same advantages result, according to the invention, as in the first embodiment.

In a modification of the illustrated embodiments, in order to form the correction block, the correction lens 12 and/or the mirror lens element 18 can be integrally formed with the beam splitter cube 6. It is also possible to combine at least one optical component made of glass with at least one optical component made of plastics material, in order to form the correction block,

The invention claimed is:

1. Reflector sight for a portable firearm, comprising:
   an optical system for generating a natural image of a target region,
   a display for reproducing an electronic image of the target region created by an electronic image creation unit,
   a beam splitter cube for overlaying the natural image with the electronic image of the target region reproduced by the display, the display is arranged on a first flat face of the beam splitter cube, to which flat face a correction lens is connected, the face of which facing the display is convex, a mirror lens element is connected to a second flat face of the beam splitter cube, the mirrored face of which mirror lens element facing away from the beam splitter cube is convex and aspherical, and the beam splitter cube, the correction lens and the mirror lens element form a correction block consisting of silica glass and/or plastics material.

2. Reflector sight according to claim 1, wherein: the correction lens and the mirror lens element are each formed by a plano-convex lens, the flat face of which is connected to the associated face of the beam splitter cube.

3. Reflector sight according to claim 1, wherein: the correction lens and the mirror lens element are integrally formed with the beam splitter cube.

4. Reflector sight according to claim 1, wherein: the mirror lens element is manufactured from a mirror lens which is machined in such a way that the cross section of the face of the mirror lens element facing the beam splitter cube corresponds to the cross section of the second flat face.

5. Reflector sight according to claim 1, wherein: the display is designed and arranged for reproducing a thermal image, such that the natural image of the target region is overlaid with a thermal image of the target region by means of the beam splitter cube.

6. Reflector sight according to claim 1, wherein: the correction block comprises at least one optical element made of silica glass, and at least one optical element made of plastics material.

7. Reflector sight according to claim 1, wherein: the beam splitter cube consists of silica glass, and in that the correction lens and/or the mirror lens element consists or consist of plastics material.

8. Reflector sight according to claim 1, wherein: at least one optical component made of silica glass is adhesively bonded to at least one optical component made of plastics material.

9. Reflector sight according to claim 1, wherein: the first flat face and the second flat face are formed by mutually opposing flat faces of the beam splitter cube.

10. Reflector sight according to claim 1, wherein: the first flat face and the second flat face are formed by flat faces of the beam splitter cube that adjoin one another, and in that the mirror lens element is designed as a half mirror.

11. Portable firearm comprising a reflector sight according to claim 1.

* * * * *